Oct. 1, 1957     J. T. PURVIS ET AL     2,807,934
FLAME TUBE SUPPORT FOR A GAS TURBINE COMBUSTION SYSTEM
Filed Dec. 6, 1951     2 Sheets-Sheet 1

INVENTORS
L. C. SECORD
J. T. PURVIS
PER

ATTORNEY.

Oct. 1, 1957
J. T. PURVIS ET AL
2,807,934
FLAME TUBE SUPPORT FOR A GAS TURBINE COMBUSTION SYSTEM
Filed Dec. 6, 1951
2 Sheets-Sheet 2
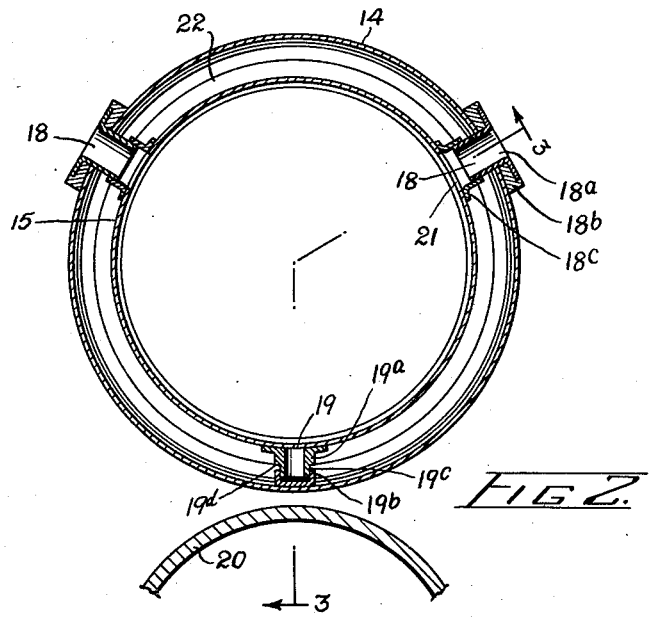
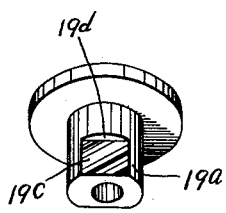
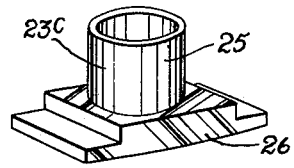
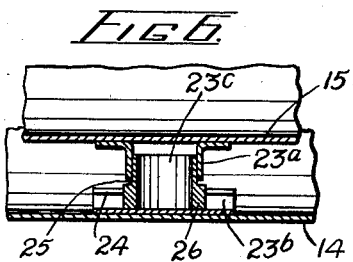
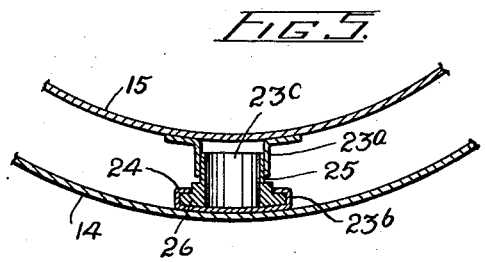
INVENTORS
L.C. SECORD
J.T. PURVIS
PER
ATTORNEY United States Patent Office 2,807,934
Patented Oct. 1, 1957

2,807,934

FLAME TUBE SUPPORT FOR A GAS TURBINE COMBUSTION SYSTEM

Joseph Thompson Purvis, North York Township, York County, Ontario, and Lloyd Calvin Secord, Toronto, Ontario, Canada, assignors to A. V. Roe Canada Limited, Malton, Ontario, Canada, a corporation Application December 6, 1951, Serial No. 260,261

7 Claims. (Cl. 60—39.31)

This invention relates to the combustion chambers of gas turbine engines and particularly to the mounting of the flame tubes therein.

A gas turbine engine such, for example, as those used in aircraft, commonly comprises a compressor into which air is drawn and compressed, a combustion system in which fuel is burned in the air compressed by the compressor, and a turbine which is driven by the hot gases discharged from the combustion system. The compressor is directly driven by the turbine through an interconnecting shaft. The shaft is supported in a portion of the engine frame, known as the backbone member, which is a hollow tubular structure surrounding the shaft and housing the shaft bearings in transversely disposed webs or diaphragms. It will be understood that the strength and rigidity of the frame is dependent upon the configuration of the said backbone member, which should be of as large a diameter as possible in order that the maximum strength and rigidity may be attained; this member however is surrounded by the combustion system, which on the other hand should be of small overall diameter in order that the frontal area of the engine may be as small as possible—an important consideration in an engine intended for installation in aircraft. It is therefore apparent then that there are limitations imposed on both the inner and outer diameters of the annular area in which the cross-sectional area of the combustion system must be accommodated, but the cross-sectional area of the combustion system has a direct bearing upon the velocity of the gases flowing therethrough and despite such limitations this area must be maintained above a certain minimum for any particular power rating, to give flow velocities which are suitable for good combustion.

A common form of combustion system comprises a group of tubular combustion chambers ranged annularly around and parallel to the longitudinal axis of the engine. Each combustion chamber contains a flame tube situated coaxially and in spaced relationship to the casing of the chamber, the purpose of the flame tube being to contain the burning gases while a layer of insulating and cooling air flows in the annular space between the said tube and the casing. The flame tube is supported within the casing of the chamber by radial members which span the annular space at a number of points near the upstream end of the tube, and also by a spigot mounting which secures the downstream end of the tube in the adjacent end of the casing. It is desirable that not less than three supports should be provided at the upstream mountings in order to insure proper concentricity of the flame tube within the casing. Three telescopic struts, as usually adopted, are capable of supporting the flame tube in three dimensions so that the spigot mounting at the downstream end is not only unnecessary in this respect, but also may cause unpredictable stresses should any distortion occur in the flame tube under operating conditions. However, the spigot mounting must be retained since a light sheet metal structure such as a flame tube cannot be entrusted to a cantilever support alone, particularly when it is operating at high temperatures in turbulent gas conditions.

Two of the upstream mounting supports are usually located so that they can be used as attachments for the interconnector tubes, which provide an external connection between each combustion chamber and the chambers adjacent to it; these two supports are therefore situated symmetrically on opposite sides of the plane containing the longitudinal axes of the engine and the flame tube. In the conventional three point arrangement, the third support is situated in the said plane and adjacent the backbone member. The attachment of the various supports is by welding. Since all the parts concerned are of sheet metal or of relatively thin section, the welding process invariably causes some distortion and the various parts have to be machined after welding to insure correct alignment and proper fits and clearances. To carry out such machining of the supports, holes must be provided through the outer casing of the combustion chamber; although two of the supports can be reached through the ports provided for the interconnector tubes, special access holes have to be made elsewhere. When the access holes are blanked off after the machining operations are completed, the blanking plates and the saddle pads required to attach them form excrescences on the outside of the casing. In the conventional three point arrangement, the excrescence due to the blanking plate and saddle pad at the support adjacent the backbone member is highly undesirable because it reduces the space available for the backbone member and places a serious limitation on its diameter.

The main object of this invention is to provide a means of support of the flame tube in a tubular combustion chamber which will eliminate the development of unpredictable stresses in the flame tube due to distortion at high temperatures.

Another object is to provide a means of supporting the flame tube such that there is no external excrescence on the surface of the surrounding combustion chamber casing in or near the plane containing the longitudinal axes of the engine and the combustion chamber, with the result that the diameter of the backbone member will be limited only by the contour of the combustion chamber. Other objects and advantages will be apparent during the course of the following description of a preferred application of the invention.

In the accompanying drawings forming a part of this application and in which like reference characters are used to designate like parts throughout the several views, Fig. 1 is a side elevation of a gas turbine engine, partly broken away to show a combustion chamber casing and flame tube installation;

Fig. 2 is a transverse cross-section of a combustion chamber taken through the upstream points of support of the flame tube;

Fig. 4 is a perspective view of a portion of the support shown as 19 on Figs. 2 and 3;

Fig. 5 is a fragmentary transverse section of an alternative form of flame tube support;

Fig. 6 is a fragmentary longitudinal section of the alternative form of support shown in Fig. 5; and Fig. 7 is a perspective view of the adapter used in the alternative form of support shown in Figs. 5 and 6.

Figure 1:
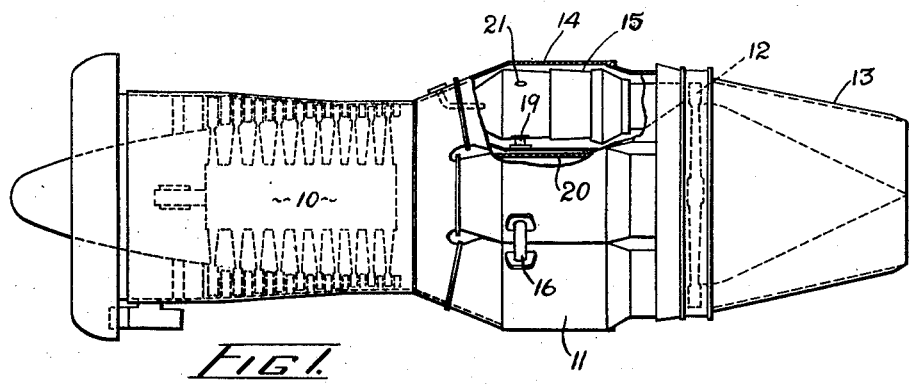

The engine shown in Fig. 1 has a compressor 10 and a combustion system comprising six annularly arranged combustion chambers 11 which discharge into a turbine 12; the exhaust gases from the turbine issue as a propulsive jet from a tail cone 13. Each combustion chamber has the usual outer and inner elements of generally circular cross-section, namely a casing 14 and a flame tube 15 situated within the casing in spaced relationship thereto. The flame tubes are interconnected by interconnector tubes 16.

Figure 3:
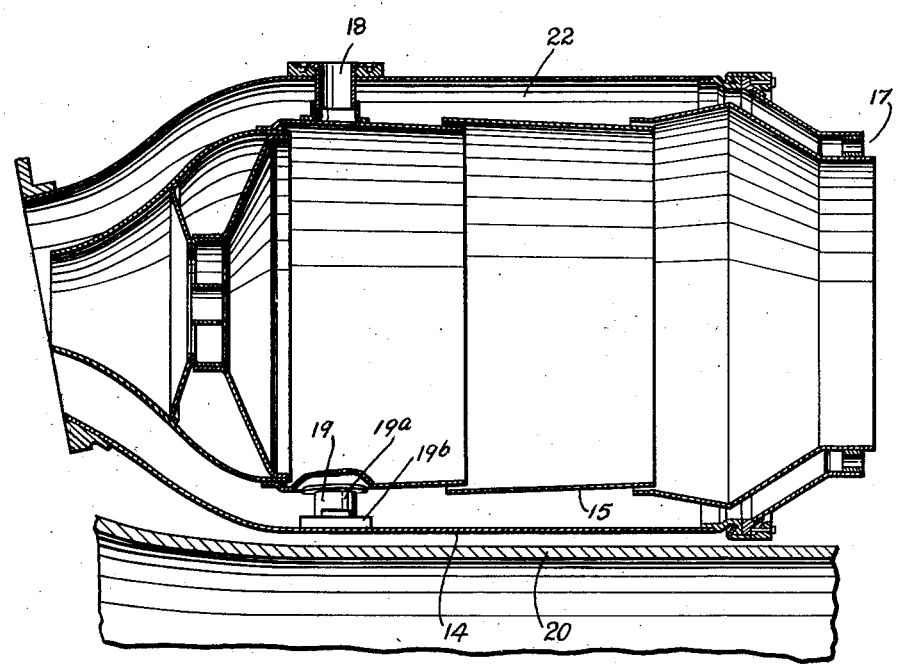
Fig. 3 is a section taken on the line 3—3 in Fig. 2.

It will be seen from Figs. 2 and 3 that the flame tube 15 is supported within the casing 14 by a spigot mounting 17 at its downstream end and by three radially disposed supports adjacent its upstream end, the latter comprising two tubular assemblies 18 and a third assembly 19 which is situated adjacent the backbone member 20. Each of the support assemblies 18 includes sections relatively slidable in the lengthwise direction of the support assembly to permit expansion and contraction of the length of the support assembly between the casing and the flame tube. Preferably the sections comprise, in telescopic relationship, a tubular plug 18a which is mounted in a saddle pad 18b on the outside of the wall of the casing 14 and protrudes through and radially inwardly from the casing, and a tubular receptacle 18c which extends radially outwardly from the flame tube and is attached thereto by welding. The tubular wall of each of the receptacles 18c surrounds a port 21 in the flame tube wall, and the interconnector tubes 16 are attached externally to the pads 18b, so that adjacent flame tubes are interconnected thereby through the support assemblies 18 and the ports 21 in each flame tube. Expansion of the flame tube 15 relative to the casing is accommodated at these supports by telescopic movement of the tubular receptacles 18c with respect to the plugs 18a.

The third support 19 is not required to serve as a conduit from the interior of the flame tube to the outside of the combustion chamber, and therefore there is no port, similar to the ports 21, at its attachment to the flame tube wall. For this reason it is referred to hereinafter as the blind support. This support, also, has sections relatively slidable in the lengthwise direction of the support, preferably comprising a generally cylindrical projection or boss 19a (see Fig. 4) welded to the flame tube wall and disposed in telescopic relationship with a guide channel 19b welded to the inner surface of the casing 14. The channel 19b is disposed longitudinally of the combustion chamber and provides a guiding surface at each side of the boss restraining lateral movement of the boss 19a but permitting relative movement in the plane of each surface. Two parallel flat surfaces 19c are provided on opposite sides of the boss 19a so that the boss slidably engages the channel over a substantial area and not tangentially along a line. Ample clearance is provided between the upper edges of the side flanges of the channel and the shoulders 19d at the upper limits of the flat surfaces 19c to permit the radial telescopic adjustment required to accommodate radial expansion of the flame tube relative to the casing.

By virtue of the arrangement described, the blind support 19 restrains the flame tube in a circumferential direction but in no other. In operation the flame tube 15 expands relative to the casing 14 since it contains the burning gases and is insulated from the casing 14 by a layer of cooling air which passes through the annular space 22 between these two components of the combustion chamber. The flame tube is located longitudinally by the two supports 18, 18 and it is supported at its upstream end radially and concentrically within the casing by the interaction of the supports 18, 18 and the blind support 19, and at its downstream end by the spigot mounting 17. However each of the individual supports 18, 18 and 19 provide for radial expansion and the spigot mounting 17 accommodates longitudinal expansion of the flame tube. The three upstream supports 18, 18 and 19 effectively centralize the flame tube in the casing by virtue of the circumferential support exercised by each, but since the blind support 19 exercises no longitudinal constraint, the upstream group of supports is not held rigidly in a transverse plane of the combustion chamber, the supports 18, 18 acting, within a limited range, as trunnions on which angular deflection of the longitudinal axis of the flame tube can occur. Thus some degree of axial distortion of the flame tube due to thermal expansion can be accommodated between the upstream supports and the downstream spigot mounting, thereby minimizing the risk of unpredictable stresses developing in the flame tube with the possible consequence of buckling or other forms of failure.

Furthermore it will be understood that any operations necessary to true up the channel 19b after welding can be effected relatively easily through the open downstream end of the casing; the problems associated with the fitting of a tubular plug or receptacle, requiring access to the work from a direction substantially along the axis thereof, are eliminated. Therefore the necessity for blanking plates and saddle pads adjacent the backbone member does not arise and the attachment of the channel 19b to the casing 14, by welding or riveting, introduces no excrescences on the outside of the casing, so that the clearance between the casing 14 and the backbone member 20 can be as small as the contour of the casing will allow; that is to say, the diameter of the backbone member can be as large as possible in view of the diameter of the combustion chamber and the mean diameter of the combustion system as a whole.

An important feature of the invention is the provision of the flat surfaces 19c on the boss 19a to engage the channel 19b. It has been found that considerable fretting occurs in flame tube supports and these large areas of contact are provided in order to reduce the pressure and the consequent fretting between the male and female members. This consideration is given special attention in the alternative arrangement of the blind support which is shown in Figs. 5, 6 and 7. In this construction a projection is again provided on the flame tube, including a receptacle 23a of similar form to the receptacles 18c. Opposite it, a longitudinally disposed channel 23b, having re-entrant flanges 24, is welded to the inner surface of the casing. The projection also includes a generally cylindrical adapter 23c interconnecting the receptacle 23a and the channel 23b. The adapter has a stem 25 and a stepped base 26; the stem telescopically engages the receptacle 23a and the stepped base slidably engages the channel 23b, so that the two parts of the projection are sections relatively slidable in the lengthwise direction of the support. The flanges 24 hold the stepped base 26 firmly in relation to the casing both radially and circumferentially, while the adapter is free to slide in the channel longitudinally and radial expansion of the flame tube is accommodated by the sliding of the receptacle 23a over the stem 25. It will be clear that the bearing surfaces between the receptacle, the adapter and the channel are of ample proportions and are greater even than the bearing surfaces provided by the flat areas 19c in the simpler construction. The operation of this form of support is similar to that described with respect to the support 19 but the greater areas of contact reduce fretting and thereby increase the life of the assembly. Moreover should excessive wear occur it is possible, in this alternative construction, to replace the adapter part 23c of the projection.

It is to be understood that the forms of the invention herewith shown and described are to be taken as preferred examples of the same. Male and female elements may be interchanged; for example, the hollow boss and the channel of the construction shown in Figures 2 and 3 could be replaced respectively by a forked or slotted boss secured to the flame tube and a single flange mounted on the casing, the flange being accommodated in the slot of the boss. Further, various methods of attachments, such as welding or riveting, may be used and it is, of course, immaterial whether the slidable end of the support is adjacent the flame tube or the casing. Thus various changes in the method of attachment, the shape, size and arrangement of the parts may be resorted to without departing from the spirit of the invention or the scope of the subjoined claims.

What we claim as our invention is:

1. In a gas turbine engine, an elongated combustion chamber comprising outer and inner elements of generally circular cross-section, namely a casing and a flame-tube inside the casing, means supporting one end of the flame-tube in radially-spaced relationship in the casing, and three supports circumferentially spaced-apart substantially equally and extending between the said combustion chamber elements in a transverse plane of the flame-tube near the other end of the flame-tube whereby the said other end of the flame-tube is supported in radially-spaced relationship in the casing, each of the supports comprising sections mounted on the flame-tube and casing respectively and relatively slidable in the radial direction of the support to permit expansion and contraction of the length of the support between the said elements, and each of the supports being secured against circumferential movement with respect to either the said elements whereby the flame-tube is located circumferentially with respect to the casing, two of the supports having cylindrical, relatively rotatable sections and being secured against longitudinal movement with respect to either of the said elements whereby the flame-tube is located longitudinally with respect to the casing, the third support comprising a projection connected to one of the combustion chamber elements and extending towards the other, the longitudinal axis of the casing being in the same plane as the longitudinal axis of the engine and the said third support being situated in said plane, and a guiding surface projecting from the other combustion chamber element towards the said one of the said elements and disposed longitudinally of the combustion chamber, the projection slidably engaging and being laterally restrained by the guiding surface whereby the transverse section of the flame-tube defined by the said transverse plane of the chamber is permitted to move angularly within the casing around a hypothetical axis of rotation passing through the said two supports.

2. The combination claimed in claim 1 in which the said third support comprises a boss secured to one of the combustion chamber elements and extending toward the other element, and a channel on the other element having parallel walls extending longitudinally of the combustion chamber, the boss having on opposite sides thereof flat surfaces slidably engaging the walls of the channel to laterally restrain movement of the boss in the channel longitudinally of the combustion chamber.

3. The combination claimed in claim 2 in which the boss is secured to the flame tube and is generally cylindrical, and the flat surfaces are formed in the cylindrical wall near the end remote from the flame tube.

4. The combination claimed in claim 1 in which the said projection is longitudinally extensible and includes a receptacle secured to one of the combustion chamber elements and extending towards the other element, a generally cylindrical adaptor and telescopically engaging the receptacle, and a channel on the other element having parallel walls extending longitudinally of the combustion chamber, the adaptor slidably engaging the walls of the channel to permit movement of the adaptor in the channel longitudinally of the combustion chamber and to restrain relative lateral movement of the adaptor with respect to the channel.

5. The combination claimed in claim 4 in which the adaptor has flat surfaces on opposite sides thereof that engage the walls of the channel, and including means on the channel engaging the adaptor to retain the adjacent end of the adaptor in the channel.

6. The combination claimed in claim 5 in which the receptacle is tubular and the adaptor has a cylindrical portion in telescopic engagement with the receptacle and a base portion providing the flat surfaces engaging the walls of the channel.

7. The combination claimed in claim 6 in which the longitudinal edges of the walls of the channel are bent toward each other to provide the said means on the channel to retain the adjacent end of the adaptor, and the base portion of the adaptor has shoulders engaged by the bent edges of the channel to retain the base portion of the adaptor in slidable engagement with the channel.

References Cited in the file of this patent

UNITED STATES PATENTS

| | | |
|---|---|---|
| 2,268,464 | Seippel | Dec. 30, 1941 |
| 2,509,503 | Huyton | May 30, 1950 |
| 2,511,432 | Feilden | June 13, 1950 |
| 2,522,081 | Allen | Sept. 12, 1950 |
| 2,547,619 | Buckland | Apr. 3, 1951 |
| 2,575,889 | Oulianoff | Nov. 21, 1951 |
| 2,581,999 | Blatz | Jan. 8, 1952 |
| 2,591,676 | Clayton | Apr. 8, 1952 |
| 2,592,060 | Oulianoff | Apr. 8, 1952 |
| 2,609,040 | Aronson | Sept. 2, 1952 |
| 2,611,243 | Huyton | Sept. 23, 1952 |
| 2,679,136 | Gaubatz | May 25, 1954 |
| 2,692,478 | Hill | Oct. 26, 1954 |

FOREIGN PATENTS

| | | |
|---|---|---|
| 621,438 | Great Britain | Apr. 8, 1949 |